United States Patent [19]

Gerster

[11] Patent Number: 4,895,458
[45] Date of Patent: Jan. 23, 1990

[54] BEARINGS FOR WIND GENERATOR ROTORS

[75] Inventor: Josef Gerster, Gröbenzell, Fed. Rep. of Germany

[73] Assignee: MAN Technologie GmbH, Munich, Fed. Rep. of Germany

[21] Appl. No.: 241,915

[22] Filed: Sep. 7, 1988

[30] Foreign Application Priority Data

Sep. 29, 1987 [DE] Fed. Rep. of Germany ....... 3732730

[51] Int. Cl.$^4$ .................. F16C 21/00; F16C 19/49
[52] U.S. Cl. ................................. 384/126; 384/454; 384/495; 384/620
[58] Field of Search ............... 384/126, 127, 192, 194, 384/450–455, 495–498, 558, 612, 613, 620, 489, 543, 586

[56] References Cited

U.S. PATENT DOCUMENTS

| 1,175,415 | 3/1916 | Egbert | 384/126 X |
| 1,319,794 | 10/1919 | Pruyn | 384/453 |
| 3,023,058 | 2/1962 | Bowers et al. | 384/620 |
| 4,294,495 | 10/1981 | Whaley | 384/452 |

FOREIGN PATENT DOCUMENTS 394598  8/1973  U.S.S.R. .............................. 384/453

Primary Examiner—Thomas R. Hannon
Attorney, Agent, or Firm—Roberts, Spiecens & Cohen

[57] ABSTRACT

A bearing system for mounting a wind generator rotor on a stub shaft comprises two axially spaced bearing units each made up of a skew joint bearing, a needle or cylindrical roller bearing placed around it and a thrust bearing arranged to the side of these bearings in order to take up vertical forces. At least two rings of the bearings form a non-rotary ring unit.

6 Claims, 2 Drawing Sheets

BEARINGS FOR WIND GENERATOR ROTORS

BACKGROUND OF THE INVENTION

The invention relates to wind generators and more specifically to a generator with rotor blades secured to a flange. In particular the invention concerns the bearing system for rotatably mounting such a flange on a vertical stub shaft by means of radial and thrust anti-friction bearings.

Such bearings for taking up axial and radial forces have so far, as is generally accepted engineering practice, been designed using taper roller bearings. In addition to the disadvantages specific to this type of bearing that the performance and working life generally depend on the quality of assembly and the extremely critical adjustment, it has been seen in practice that the flexure of the hub leads to displacement of the external race ring of the inner bearing. Such motion of the outer race ring of the bearing for the taper rollers is not permissible, since there is then no longer any completely regular rolling of the anti-friction elements on the ring and instead there tends to be a pushing component. In such a situation there will then be signs of failure impairing reliable function of the bearings and more especially scoring will lead to tracks being formed in the inner race ring with spalling so that the bearings and thus the entire system will fail to function after a comparatively short period of use.

SUMMARY OF THE INVENTION

One object of the present invention is to provide a high quality stub shaft-mounted bearing exhibiting superior operational characteristics when subjected to the specific form of load occurring when used for carrying the blades of a wind generator rotor.

A still further object of the invention is to create such a bearing which is endowed with a long working life.

In order to achieve these or other objects, the invention provides two spaced bearing combinations, consisting of a skew joint bearing, a needle or cylinder roller bearing arranged over the latter and an axial bearing arranged to the side of said needle or roller bearing to take up vertical forces, with the formation of a rotationless ring unit, which is made up of the outer ring of the skew joint bearing, of the inner ring of the needle or roller bearing and of a thrust bearing shaft ring, such elements being in contact with each other in two planes and being preloaded in relation to each other. The skew joint bearings allow flexure of the shaft so that micromovements are thus not allowed to affect the anti-friction bearing means, which allows adjustment of the blade with only a low resistance thereto. The rotationless ring unit, made up of the outer ring of the skew joint bearing, the inner ring of the needle bearing and the shaft ring of the thrust bearing is caused to perform a constant migratory motion by the micromovements of the skew joint bearing. It is in this manner that pressure points on the bearings are avoided and there is no spalling.

An alternative design in accordance with the invention is characterized by two spaced bearing combinations consisting of a skew joint bearing, a needle or cylinder roller bearing without an inner ring and arranged over the skew joint bearing, and a needle bearing which does not have any inner ring and is arranged to the side of outer ring of the skew joint bearing, the outer ring of the skew joint bearing being a rotationless unit. Such an arrangement designed without inner rings for the needle bearings makes a smaller overall size possible.

In accordance with a further feature of the invention, in the bearing combination there is a seal between the lower side of the flange and the hub using a cover with a special purpose seal, the latter then fitting around the cover on the outer side and being so designed that a respective lip on the one hand bears on a land of the inner ring of the skew joint bearing or on an intermediate ring placed between the latter inner ring and the hub collar, and on the other hand in a lower plane in a shaft of the hub. It is in this manner that one may be sure of lubrication sufficient for the full working life of the anti-friction bearings.

Further advantages and features of the invention will be seen from the following description of two working embodiments thereof.

DETAILED DESCRIPTION OF EMBODIMENTS OF THE INVENTION

Figure 1:
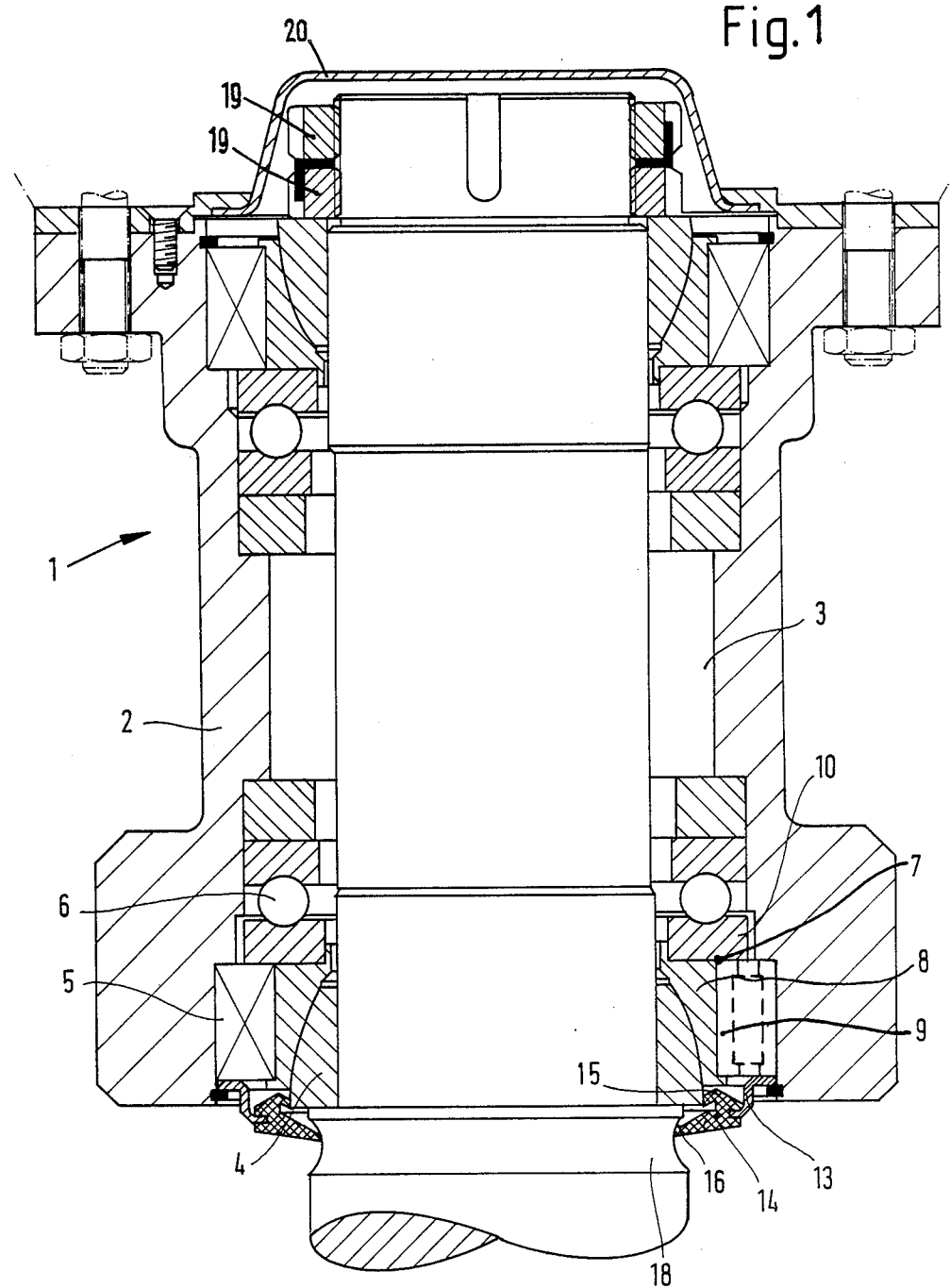
FIG. 1 is a sectional view of the bearing connecting the rotor of a wind generator with a supporting stub shaft.

FIG. 1 shows the bearing 1 on the support stub shaft 3 for carrying the blades of a wind generator. The rotor is not shown in the drawing in full and its blades are mounted on a blade bearer flange 2. The blade bearer flange 2 is supported on hub 3 by way of two spaced bearing combinations. One such bearing combination consists of one skew joint bearing 4, a needle or cylindrical roller bearing 5 arranged thereover and a thrust bearing 6 arranged to the side thereof to resist vertical forces. This design leads to a rotationless ring unit 7 made up of the outer ring 8 of the skew joint bearing 4, of the inner race ring 9 of the needle or cylindrical roller bearing and of the shaft ring 10 of the thrust bearing. The bearing combinations are preloaded in relation to each other by means of two locked shaft nuts 19 acting via the blade bearer flange 2 and the hub 3. The end of the hub carries a cap 20 by means of which the bearing system is protected against the ingress of dust.

At the lower end of the blade bearer flange 2, a cover 13 is arranged which is preloaded or clamped onto the needle bearing 5. The inner edge of this cover supports a seal 14, whose seal lips 15 and 16 are respectively in engagement with the free end of the inner ring of the skew joint bearing 4 and, with the groove 18 of the hub 3 so that such seal acts to prevent access of dust to the bearing system and defines a grease space for a lubricating effect lasting the full working life of the arrangement.

Figure 2:
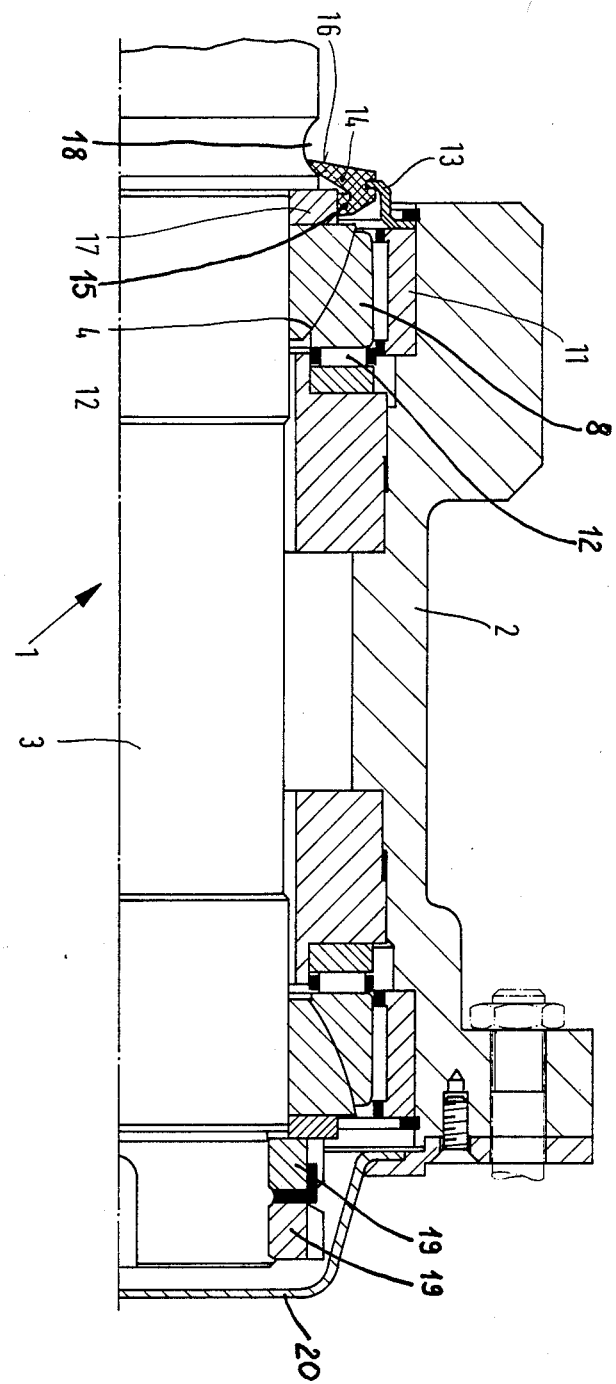
FIG. 2 shows a modified form of the bearing and the supporting stub shaft in section.

FIG. 2 shows a modified form of the bearing 1 for a support stub shaft in accordance with the invention. In this case the bearing combination consists of a skew joint bearing 4, a needle or cylindrical roller bearing 11 not having an inner race ring and arranged over the bearing 4, and a needle bearing 12 arranged to the side of the outer ring 8 of the skew joint bearing and not having an inner ring. The rotationless ring unit is made up by the outer ring 8 of the skew joint bearing 11. A cover 13 is arranged at the lower end of the blade bearer flange 2 and it is preloaded towards the needle bearing. The inner edge of the cover 13 carries a seal 14, whose sealing lip 15 rests on a an intermediate ring placed between the collar of the hub 3 and the skew joint bearing 4 and whose sealing lip 16 fits into the groove 18 in the hub.

The surfaces of the skew bearings can carry lubricant coatings, such as FIBERGLIDE coating. FIBERGLIDE is a trademark of Erma-Werke of Dachau, Germany and refers to coatings or sheets of plies of fiber, such as Teflon and polyester in a resin binder and having an adhesive application surface.

What is claimed is:

1. In a bearing for supporting the rotor blades of a wind power generator, said rotor having blades mounted on a bearer flange comprising thrust and radial bearing means supporting the flange on a stationary hub, the improvement wherein said bearing means comprises two axially spaced bearing combinations each including a first bearing in the form of a skew joing bearing including an outer ring, a second bearing with cylindrical rolling elements placed around the skew joint bearing and including an inner ring, and a third bearing including a thrust bearing arranged to the side of both the first bearing and the second bearing and a shaft ring, the outer ring of the first bearing, the inner ring of the second bearing and the shaft ring of the third bearing constituting a rotationless ring unit, said three rings contacting each other in two planes and being preloaded to hold the rings in engagement with each other.

2. The structure as claimed in claim 1 wherein said first bearings carry lubricant coatings.

3. The structure as claimed in claim 1 wherein one of said bearing combinations is placed under a lower side of said flange and comprises a cover with a fitted seal on said cover and having two lips of which one engages a land on the inner ring of the skew joint bearing or an intermediate ring arranged between the latter and a collar on the hub and the other lip engages in a groove in the hub.

4. In a bearing for supporting the rotor blades of a wind power generator, said rotor having blades mounted on a bearer flange comprising thrust and radial bearing means supporting the flange on a stationary hub, the improvement wherein said bearing comprises two axially spaced bearing combinations each including a first bearing in the form of a skew joint bearing including an outer ring, a second bearing on the first bearing including cylindrical rolling elements, and a needle bearing arranged to the side of said outer ring, said outer ring being rotationfree.

5. The structure as claimed in claim 4 wherein said first bearings carry lubricant coatings.

6. The structure as claimed in claim 4 wherein one of said bearing combinations is placed under a lower side of said flange and comprises a cover with a seal fitted on said cover and having two lips of which one engages a land on the inner ring of the skew joint bearing or an intermediate ring arranged between the latter and a collar on the hub and the other lip engages in a groove in the hub.

* * * * *